(12) United States Patent
Mayer et al.

(10) Patent No.: US 7,051,675 B1
(45) Date of Patent: May 30, 2006

(54) AUTOMATIC ANIMAL FEEDER

(76) Inventors: Richard E. Mayer, 22 Theodore La., Norwalk, CT (US) 06851; John Cramer, 22 Theodore La., Norwalk, CT (US) 06851; Heather J. Cramer, 22 Theodore La., Norwalk, CT (US) 06851

( * ) Notice: Subject to any disclaimer, the term of this patent is extended or adjusted under 35 U.S.C. 154(b) by 56 days.

(21) Appl. No.: 10/859,931

(22) Filed: Jun. 4, 2004

(51) Int. Cl.
*A01K 1/10* (2006.01)
*A01K 39/00* (2006.01)
*A01K 5/00* (2006.01)

(52) U.S. Cl. .................................. 119/51.11; 222/650
(58) Field of Classification Search ............... 119/51.5, 119/61.5, 57.92, 53, 51.01, 51.11; 292/144, 292/138, 25; 70/92; 312/330.1; 49/280, 49/29, 30
See application file for complete search history.

(56) References Cited

U.S. PATENT DOCUMENTS

| | | | |
|---|---|---|---|
| D249,284 S | 9/1978 | Hericourt | |
| 4,422,409 A | 12/1983 | Walker et al. | |
| 4,563,625 A * | 1/1986 | Kornbrekke et al. | 318/603 |
| 4,617,874 A * | 10/1986 | Zammarano | 119/51.12 |
| 4,733,634 A | 3/1988 | Hooser | |
| 4,932,361 A | 6/1990 | Deutsch et al. | |
| 5,138,980 A | 8/1992 | Ewing | |
| 5,200,891 A * | 4/1993 | Kehr et al. | 221/2 |
| 5,299,529 A * | 4/1994 | Ramirez | 119/51.11 |
| 5,743,210 A * | 4/1998 | Lampe | 119/51.5 |
| 5,802,991 A * | 9/1998 | Brown et al. | 109/19 |

* cited by examiner

*Primary Examiner*—Teri Pham Luu
*Assistant Examiner*—Joshua Michener

(57) ABSTRACT

An automatic animal feeder includes a housing has a top wall, a bottom wall and a peripheral wall having an opening therein. A plurality of food delivery assemblies is positioned in the opening. Each of the food delivery assemblies includes a food drawer slidably positioned in the opening. The drawer is selectively extended inwardly or outwardly of the housing when a rod threadably coupled thereto is rotated. A motor is mechanically coupled to the driving rod. A processor is mounted in the housing and is electrically coupled to each of the food delivery assemblies for selectively turning on the motors. A first time control is electrically coupled to the processor for selectively inputting a time and date when each of a selected one of the food trays will be extended outwardly from the housing. A cooling assembly is mounted in the housing for selectively cooling an interior of the housing.

6 Claims, 5 Drawing Sheets

AUTOMATIC ANIMAL FEEDER

BACKGROUND OF THE INVENTION

1. Field of the Invention

The present invention relates to animal feeding devices and more particularly pertains to a new animal feeding device for refrigerating and selectively serving pet food.

2. Description of the Prior Art

The use of animal feeding devices is known in the prior art. U.S. Pat. No. 4,932,361 describes a device for feeding a dog at selected times. Another type of animal feeding device is U.S. Pat. No. 5,138,980 having a dish, which may be cooled or heated to keep pet food at a selected temperature. Yet another device is U.S. Pat. No. 4,617,874 that includes a housing having an opening in a top wall and food dish that is rotatable within the housing so that compartments of the food dish may be selectively aligned with the opening in the top wall.

While these devices fulfill their respective, particular objectives and requirements, the need remains for a device that is particularly well suited for feeding cats. Often cats are fed food, which must be refrigerated after removing it from a can. Additionally, a refrigeration system should also be incorporated with a housing that may be programmed for ejecting a food dish having the refrigerated cat food therein. The housing should be programmable for dispensing multiple food dishes over a plurality of days.

SUMMARY OF THE INVENTION

The present invention meets the needs presented above by generally comprising a housing having a top wall, a bottom wall and a peripheral wall that is attached to and extends between the top and bottom walls. The peripheral wall has an opening therein. A plurality of food delivery assemblies is positioned in the opening. Each of the food delivery assemblies includes a food drawer that is slidably positioned in the opening. A driving rod is threadably coupled to the food drawer. The drawer is extended outwardly of the housing when the rod is rotated along its access in a first direction and retracted inward of the housing when the rod is rotated in a second direction. A motor is mounted in the housing and is mechanically coupled to the driving rod. A processor is mounted in the housing and is electrically coupled to each of the food delivery assemblies and adapted for selectively turning on the motors. A power supply is electrically coupled to the processor. A first time control is electrically coupled to the processor for selectively inputting a time and date when each of a selected one of the food trays will be extended outwardly from the housing. A cooling assembly is mounted in the housing for selectively cooling an interior of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
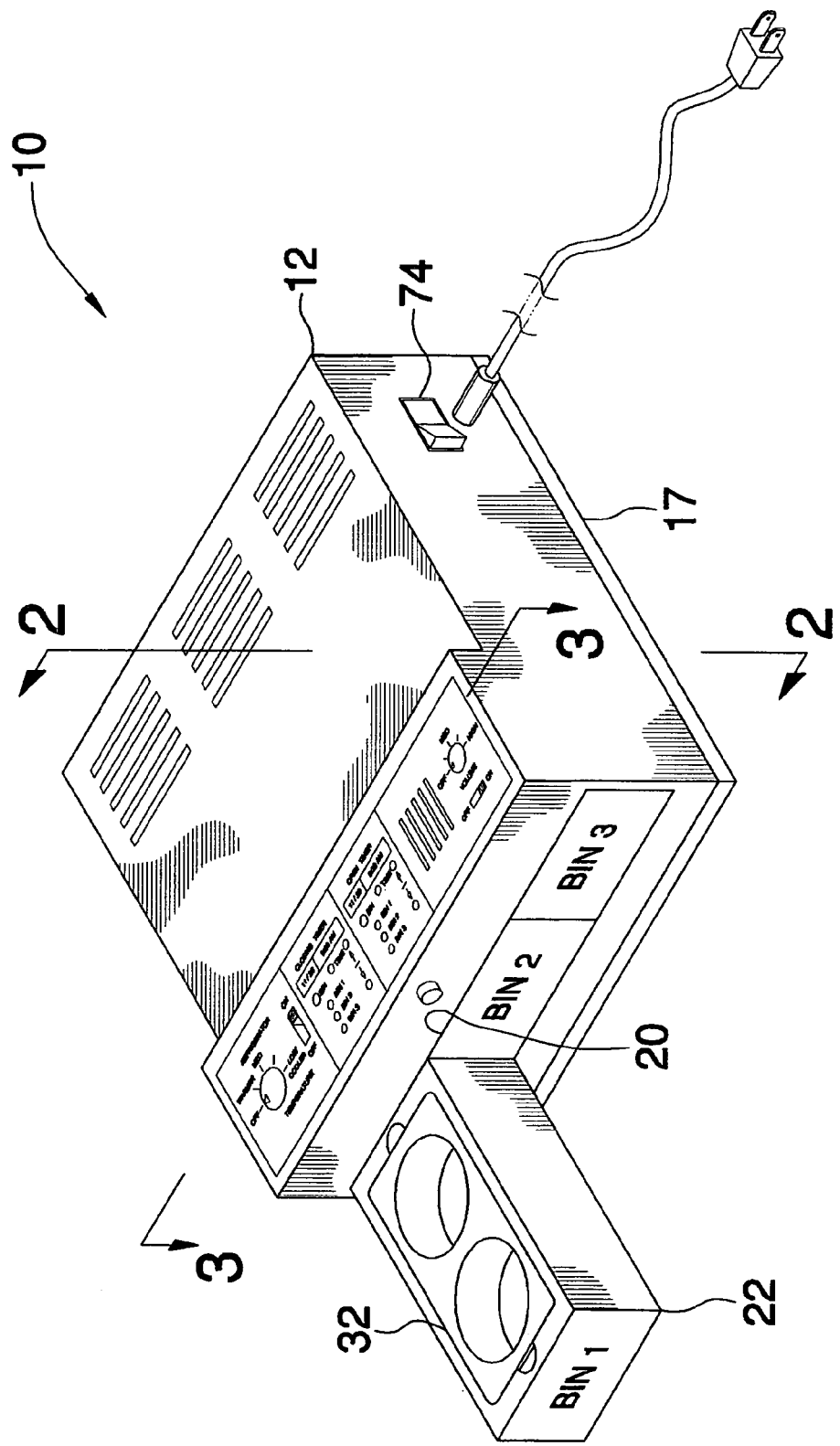
FIG. 1 is a perspective view of an automatic animal feeder according to the present invention.
Figure 2:
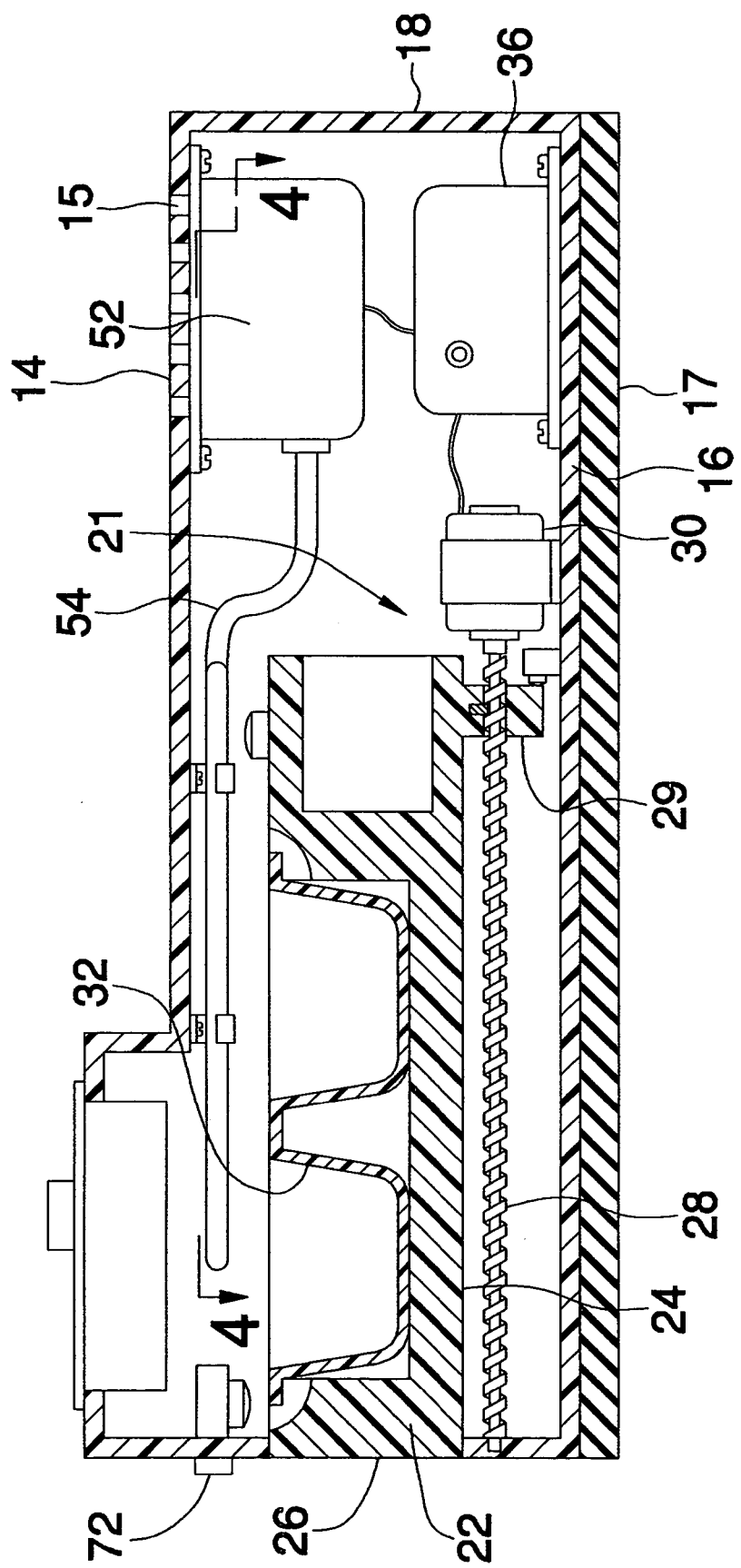
FIG. 2 is a cross-sectional view taken along line 2—2 of FIG. 1 of the present invention.
Figure 3:
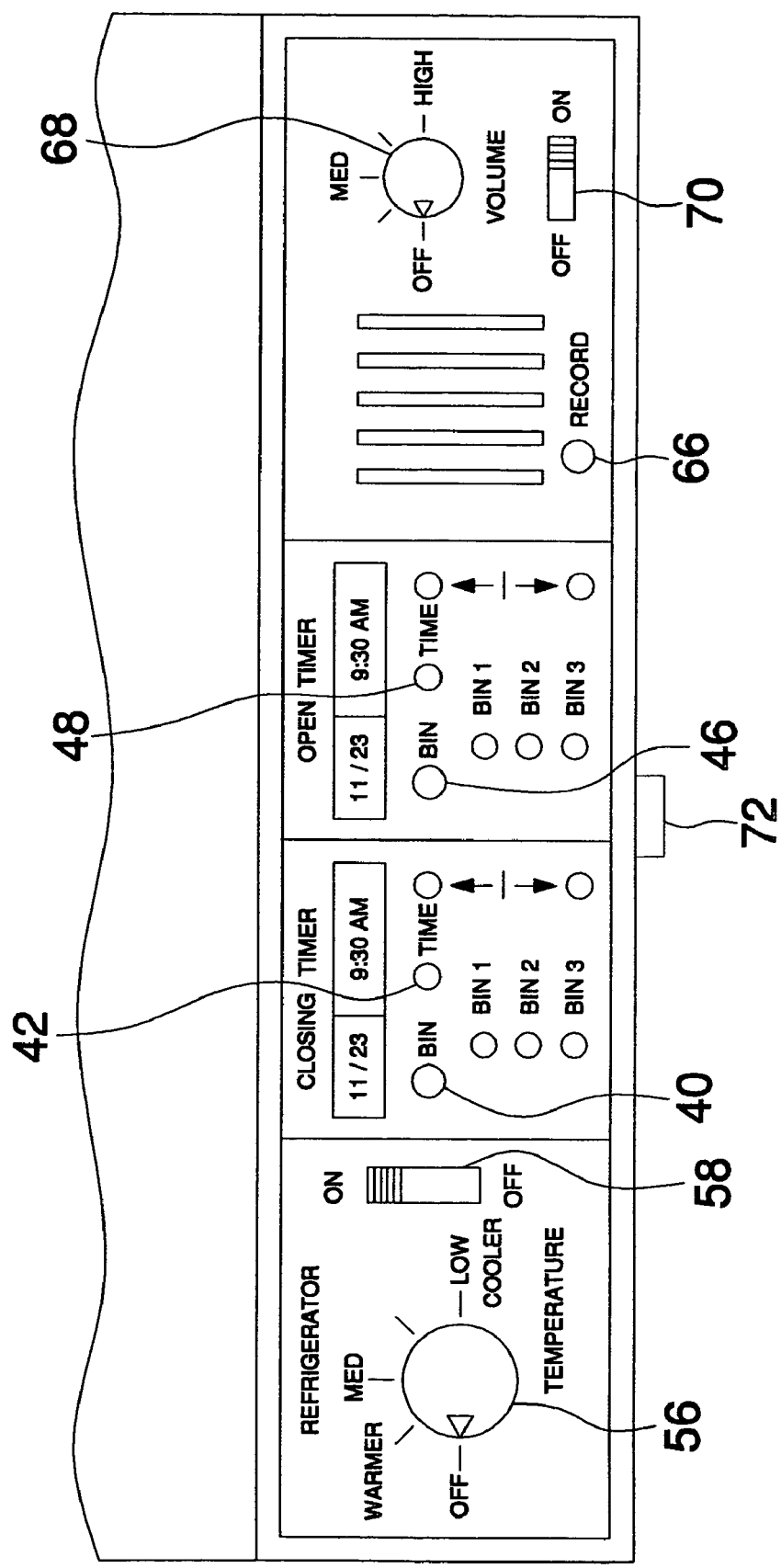
FIG. 3 is a top view taken along line 3—3 of FIG. 1 of the present invention.
Figure 4:
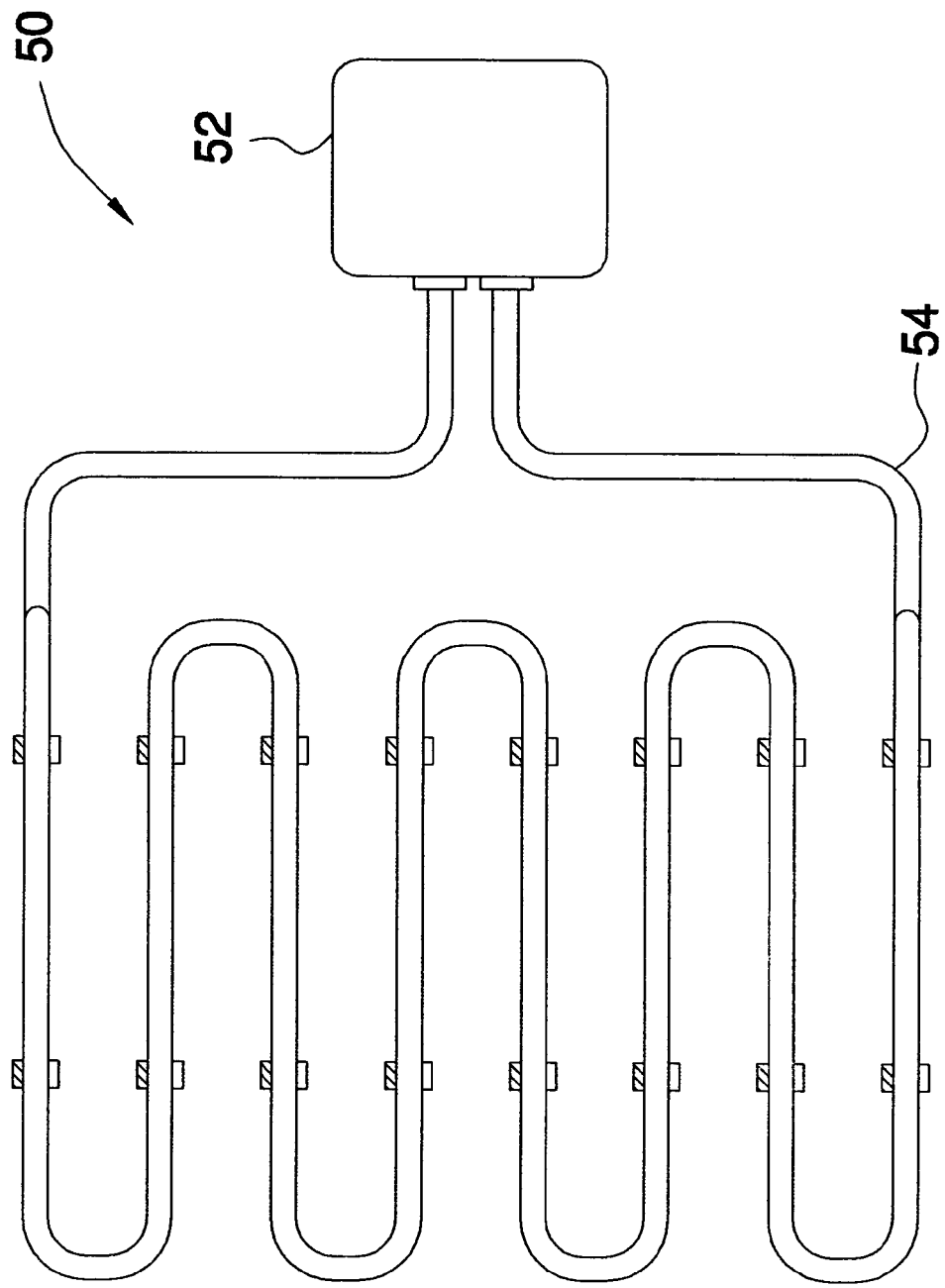
FIG. 4 is a top view of the compressor and cooling coils of the present invention.
Figure 5:
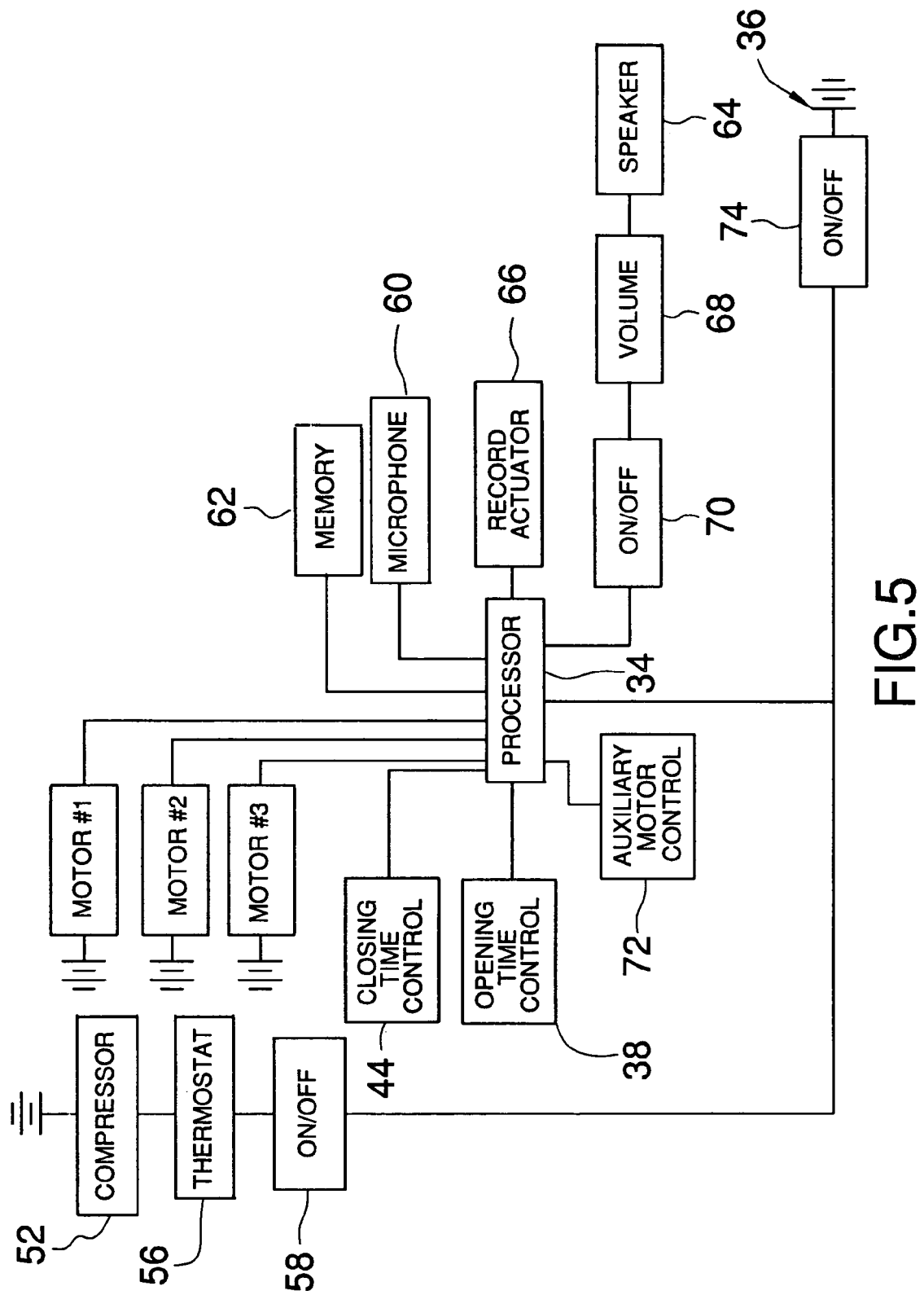
FIG. 5 is an electronic schematic view of the present invention.

With reference now to the drawings, and in particular to FIGS. 1 through 5 thereof, a new animal feeding device embodying the principles and concepts of the present invention and generally designated by the reference numeral 10 will be described.

As best illustrated in FIGS. 1 through 5, the automatic animal feeder 10 generally comprises a housing 12 with a top wall 14, a bottom wall 16 and a peripheral wall 18 that is attached to and extends between the top 14 and bottom 16 walls. The peripheral 18 wall has an opening 20 therein, though additional openings may also be extended through the peripheral wall 18. The top wall 14 have openings 15 there for circulating air and an elastomeric mat 17 may be attached to and substantially cover the bottom wall 16 to prevent damage to floor and to resist movement of the housing 12.

Each of a plurality of food delivery assemblies 21 is positioned in the opening 20. Alternatively, each of the food delivering assemblies may each be placed in each of the openings if additional openings are provided. Each of the food delivery assemblies 21 includes a food drawer 22 that is slidably positioned in the opening 20. The food drawer 22 includes a base wall 24 and a perimeter wall 26 that is attached to and extends upwardly form the base wall 22. A driving rod 28 is threadably coupled to the food drawer 22. In particular, the driving rod 28 is threadably coupled to a plate 29 that is attached to and extends downwardly from the base wall 24. An end of the rod may be rotatably extended into the peripheral wall 18 to provide more stability for the rod and to prevent the drawer 22 from falling away from the housing 12. The drawer 22 is extended outwardly of the housing 12 when the rod 28 is rotated along its access in a first direction and retracted inward of the housing 12 when the rod 28 is rotated in a second direction. A motor 30 is mounted in the housing and is mechanically coupled to the driving rod 28. The motor 30 is adapted for selectively rotating the rod 28 in the first or second directions. A food tray 32 is removably positioned in the food drawer 22. The food tray 32 includes at least two wells for the positioning of food therein. The plurality of food delivery assemblies 21 includes at least three food delivery assemblies.

A processor 34 is mounted in the housing 12. The processor 34 is electrically coupled to the motors 32 of each or the food delivery assemblies 21 and is adapted for selectively turning on the motors 32 in the first or second directions. A power supply 36 is electrically coupled to the processor 34. The power supply 36 may include a rechargeable battery mounted in the housing 12.

A first time control 38 is electrically coupled to the processor 34 for inputting the dates and times when the drawers 22 will be separately extended outwardly of the housing 12. The first time control 38 includes a first drawer selector 40 adapted for selecting one of the food delivery assemblies 21 and a first time selector 42 for selecting an actuation time for a selected one of the food delivery assemblies 21. The food drawer 22 of the selected one of the food delivery assemblies 21 is extended outwardly from the housing when the selected time arrives.

A second time control 44 is electrically coupled to the processor 36 for inputting the dates and times when the drawers 22 will be separately extending inward of the housing 12. The second time control 44 includes a second drawer selector 46 adapted for choosing one of the food delivery assemblies 21 and a second time selector 48 for selecting an actuation time for a chosen one of the food delivery assemblies 21. The food drawer 22 of the chosen one of the food delivery assemblies 21 is retracted inwardly of the housing 12 when the time selected with the second time control arrives 44. The second time control 44 will generally be used to select times about 10 minutes after the times selected by the first time control 38 so that the drawers 22 are only exposed for that amount of time.

A cooling assembly 50 is mounted in the housing 12. The cooling assembly 50 is electrically coupled to the power supply 36 and includes a compressor 52 and a plurality of cooling coils 54 fluidly coupled to the compressor 52. The cooling coils 54 are attached to a bottom surface of the top wall 14. A thermostat 56 is electrically coupled to the compressor 52 for selectively determining a temperature of an interior of the housing 12. A cooling actuator 58 is electrically coupled to the compressor 52 for selectively turning the compressor 52 on or off.

A sound recording and playback assembly is electrically coupled to the processor 34. The sound recording and playback assembly is adapted for selectively recording sounds and selectively playing recorded sounds. The sound recording and playback assembly includes a microphone 60 for receiving sounds and a memory storage means 62 for storing the sounds received by the microphone 60. A speaker 64 emits the sounds that are stored on the memory storage means 62. A record button 66 is provided to activate the microphone 60. The processor 34 is adapted for actuating the sound recording and playback assembly such that the recorded sounds are played when the food drawers 22 are extended outwardly of the housing 12. Volume 68 and power 70 controls are also coupled to the speaker 64 for controlling the volume of the sounds being played back. A play actuator may also be furnished for selectively playing the sounds recorded.

In use, the feeder 10 is particularly well suited for storing cat food which requires refrigeration. The user of the feeder 10 first places food in each of the food drawers 22. There may be provided an override switch 72 for simultaneously opening and closing all of the drawers 22 for the easy filling and cleaning of the food drawers 22. The first drawer selector 40 is used to select one of the drawers 22 and the first time selector 42 is then used to select the date and time that the drawer 22 selected will open. The second drawer selector 46 is then used for selecting the same drawer 22 and the second time selector 48 is then used to select the date and time that the drawer 22 will close. This is done in turn for each of the drawers 22. Alternatively, a system is envisioned wherein a first date and a time is selected for each drawer 22 and then a second selector is used for determining the amount of time the drawer 22 is open. The sound recording and playback allows the owner to audibly record the pet's name so that the name is called out when the drawer is opened. This will signal to the animal that the drawer 22 is open and it can eat. The drawers 22 can be programmed so that one or more of the drawers 22 can be opened over a period of two or more days. A master shut off switch 74 may be provided for shutting off power to the processor 34 and the compressor 52.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An automatic pet feeder apparatus comprising:
    a housing having a top wall, a bottom wall and a peripheral wall being attached to and extending between said top and bottom walls, said peripheral wall having an opening therein;
    a plurality of food delivery assemblies being positioned in said opening, each of said food delivery assemblies including;
    a food drawer being slidably positioned in said opening;
    a driving rod being threadably coupled to said food drawer, wherein said drawer is extended outwardly of said housing when said rod is rotated along its access in a first direction and retracted inward of said housing when said rod is rotated in a second direction;
    a motor being mounted in said housing and being mechanically coupled to said driving rod;
    a processor being mounted in said housing, said processor being electrically coupled to each of said food delivery assemblies and adapted for selectively turning on said motors;
    a power supply being electrically coupled to said processor;
    a first time control being electrically coupled to said processor for selectively inputting a time and date when each of a selected one of said food trays will be extended outwardly from said housing;
    a second time control being electrically coupled to said processor for selectively inputting a time and date when each of a selected one of said food trays will be retracted inwardly of said housing; and
    a cooling assembly being mounted in said housing for selectively cooling an interior of said housing.

2. The apparatus according to claim 1, wherein each of said food delivery assemblies further includes a food tray being removably positioned in said food drawer.

3. The apparatus according to claim 1, further including a sound recording and playback assembly being electrically coupled to said processor, said sound recording and playback assembly being adapted for selectively recording sounds and selectively playing recorded sounds, said processor being adapted for actuating said sound recording and playback assembly such that the recorded sounds are played when said food drawers are extended outwardly of said housing.

4. The apparatus according to claim 1, further including a sound recording and playback assembly being electrically coupled to said processor, said sound recording and playback assembly being adapted for selectively recording sounds and selectively playing recorded sounds, said processor being adapted for actuating said sound recording and playback assembly such that the recorded sounds are played when said food drawers are extended outwardly of said housing.

5. An automatic pet feeder apparatus comprising:
   a housing having a top wall, a bottom wall and a peripheral wall being attached to and extending between said top and bottom walls, said peripheral wall having an opening therein;
   a plurality of food delivery assemblies being positioned in said opening, each or said food delivery assemblies including;
      a food drawer being slidably positioned in said opening, said food drawer including a base wall and a perimeter wall being attached to and extending upwardly form said base wall;
      a driving rod being threadably coupled to said food drawer, wherein said drawer is extended outwardly of said housing when said rod is rotated along its access in a firm direction and retracted inward of said housing when said rod is rotated in a second direction;
      a motor being mounted in said housing and being mechanically coupled to said driving rod, said motor being adapted for selectively rotating said rod in said first or second directions;
      a food tray being removably positioned in said food drawer;
   a processor being mounted in said housing, said processor being electrically coupled to said motors of each of said food delivery assemblies and being adapted for selectively turning on said motors in said first or second directions;
   a power supply being electrically coupled to said processor;
   a first time control being electrically coupled to said processor for selectively inputting a time and date when each of a selected one of said food trays will be extended outwardly from said housing;
   a second time control being electrically coupled to said processor for selectively inputting a time and date when each of a selected one of said food trays will be retracted inwardly of said housing;
   a cooling assembly being mounted in said housing, said cooling assembly being electrically coupled to said power supply, said cooling assembly including a compressor and a plurality of cooling coils fluidly coupled to said compressor, said cooling coils being attached to a bottom surface of said top wall, a thermostat being electrically coupled to said compressor for selectively determining a temperature of an interior of the housing, a cooling actuator being electrically coupled to said compressor for selectively turning said compressor on or off; and
   a sound recording and playback assembly being electrically coupled to said processor, said sound recording and playback assembly being adapted for selectively recording sounds and selectively playing recorded sounds, said processor being adapted for actuating said sound recording and playback assembly such that the recorded sounds are played when said food drawers are extended outwardly of said housing.

6. The apparatus according to claim 5, an elastomeric mat being attached and substantially covering said bottom wall.

* * * * *